United States Patent
Reznick

[11] 3,771,361
[45] Nov. 13, 1973

[54] ULTRASONICALLY CLEANED ELECTRODE AND FLOWMETER USING IT

[75] Inventor: Stephen Reznick, Cherry Hill, N.J.

[73] Assignee: Emerson Electric Co., St. Louis, Mo.

[22] Filed: Apr. 20, 1972

[21] Appl. No.: 245,815

[52] U.S. Cl. ............................ 73/194 EM, 204/222
[51] Int. Cl. ............................ G01f 1/00, G01p 5/08
[58] Field of Search ................. 73/194 EM, 71.5 U, 73/194 E; 310/11, 26; 204/222

[56] References Cited
UNITED STATES PATENTS

| 3,229,129 | 1/1966 | Van Haagen | 310/26 |
| 3,479,873 | 11/1969 | Hermanns | 73/194 EM |
| 3,664,191 | 5/1972 | Hermanns | 73/194 EM |
| 3,387,492 | 6/1968 | Mannherz et al. | 73/194 EM |
| 3,490,282 | 1/1970 | Wada | 73/194 EM |
| 2,153,571 | 4/1939 | Kallmeyer | 310/26 UX |
| 3,256,738 | 6/1966 | Giacomo et al. | 73/290 V |
| 3,266,311 | 8/1966 | Andreasen et al. | 73/290 V |

*Primary Examiner*—Charles A. Ruehl
*Attorney*—Philip B. Polster et al.

[57] ABSTRACT

An electromagnetic flowmeter in which the opposed pick-up electrodes are button electrodes having hollow stems and concave button faces. The central part of the button is about 0.05 inches thick and a transducer stack including a piezoelectric ceramic disk is clamped against the inner wall of the button (the bottom of the hollow stem) by a compression screw at the free end of the stem.

25 Claims, 7 Drawing Figures

3,771,361

ULTRASONICALLY CLEANED ELECTRODE AND FLOWMETER USING IT

BACKGROUND OF THE INVENTION

This invention relates to an improved ultrasonically cleaned electrode having particular usefulness in an electromagnetic flowmeter.

The use of ultrasonic transducers, i.e., devices which convert a high frequency electrical voltage to a mechanical vibration at ultrasonic frequencies, to clean electrodes which are exposed to a contaminating fluid is well known. Examples of such ultrasonically cleaned electrodes may be found, for example, in U.S. Pat. No. 3,229,129 to R. H. van Haagen and in U.S. Pat. No. 3,479,873 to H. Hermanns. These electrodes, however, have suffered from certain drawbacks such as their bulkiness, difficulties in manufacturing them and in sealing them, and their low efficiency both in terms of power consumption and cleaning action.

SUMMARY OF THE INVENTION

Therefore, it is one of the objects of this invention to provide an ultrasonically cleaned electrode which is small in size and easy to manufacture.

It is another object to provide such an electrode which is not itself subject to leakage, which is easily mounted in an electromagnetic flowmeter and which effectively seals itself against the wall of the flowmeter.

Another object is to provide such an electrode assembly which provides a highly efficient self cleaning action.

Other objects will occur to those skilled in the art in light of the following description and accompanying drawings.

In accordance with this invention, briefly stated, an electrode having particular use in an electromagnetic flowmeter is provided which includes a hollow electrode body having a thin closure wall at its inner end. The outer face of the closure wall constitutes the electrode face, and an electroacoustical transducer is held against the closure wall, preferably by a compression member. Two such electrodes are utilized in an electromagnetic flowmeter. Preferably, the electrode includes a hollow stem and an enlarged button part. The electrode is adapted to be mounted in a flowmeter with the stem extending through the meter wall and the button held against the inside of the meter wall. The cavity in the electrode stem extends to within a short distance, preferably less than 0.08 inches, of the broad face of the electrode button part. Therefore, the wall between the cavity and the broad face forms a diaphragm. An electroacoustical transducer is held against the diaphragm wall, preferably by a compression element at the open end of the electrode stem. The electrode body is preferably unitary and the electrode face is preferably concave.

DESCRIPTION OF THE PREFERRED EMBODIMENT

Figure 7:
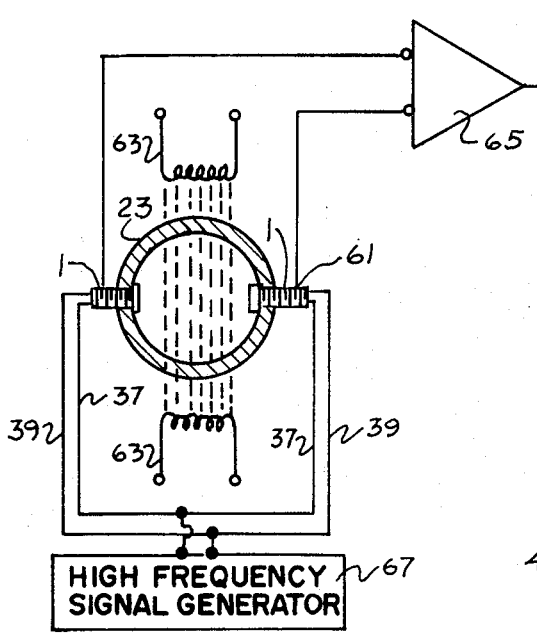
FIG. 7 is a schematic diagram of an electromagnetic flowmeter including a pair of the electrodes of FIG. 1.

Referring now to the drawings, reference numeral 1 indicates one illustrative embodiment of ultrasonically cleaned electrode of this invention. As will be described, the electrode 1 is designed for use in an electromagnetic flowmeter, as shown in FIG. 7. Mounting of the electrode 1 in the meter flow 2 is shown in detail in FIG. 2.

The electrode 1 includes a unitary body 3 having a hollow stem part 5 and an enlarged button part 7, an electroacoustical transducer assembly 9 inside the hollow stem 5, and a compression screw assembly 11 for holding the transducer assembly 9 against a rear face of the button part 7 as explained hereinafter.

Figure 1:
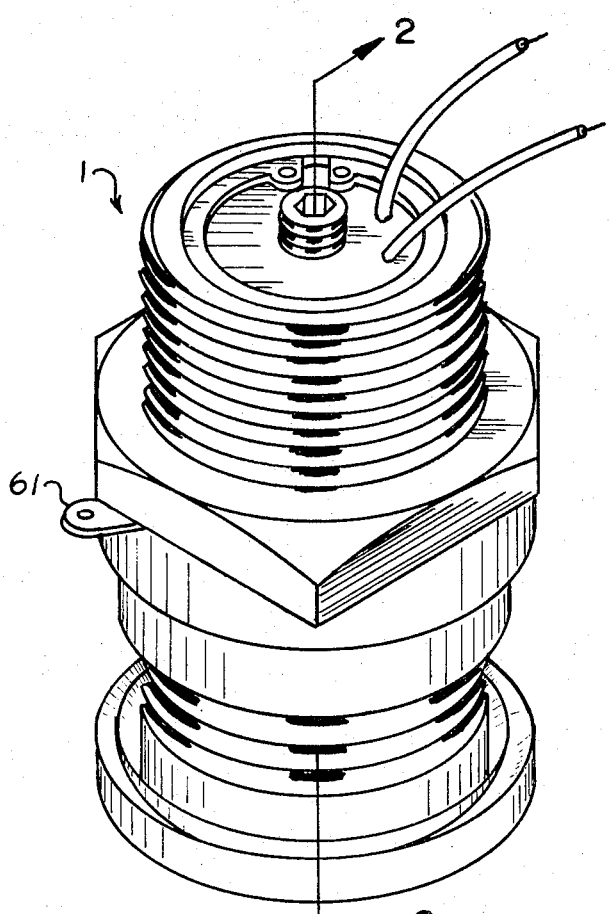
FIG. 1 is a view in perspective of an ultrasonically cleaned electrode of the present invention.
Figure 2:
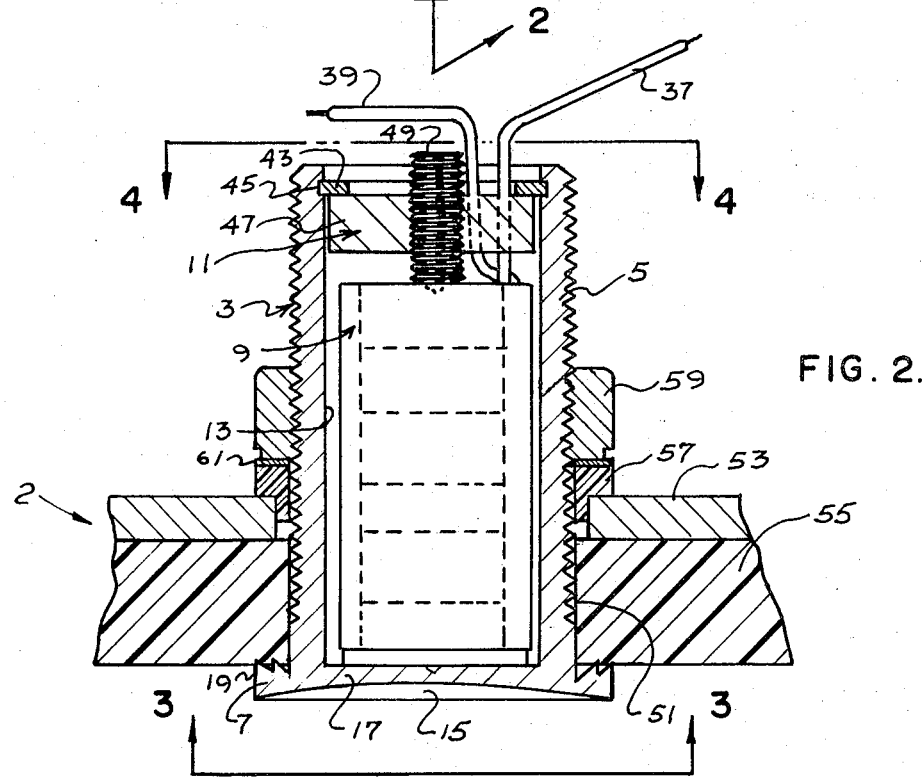
FIG. 2 is a sectional view taken along the line 2—2 of FIG. 1, showing the electrode installed in an electromagnetic flowmeter.
Figure 3:
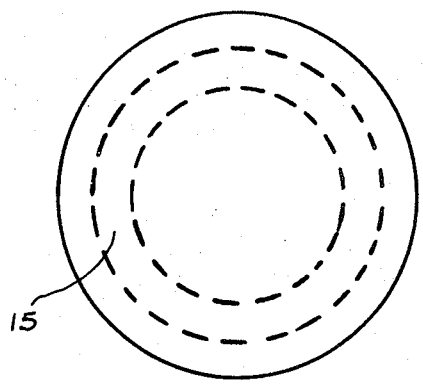
FIG. 3 is a bottom plan view of the electrode of FIG. 1.
Figure 4:
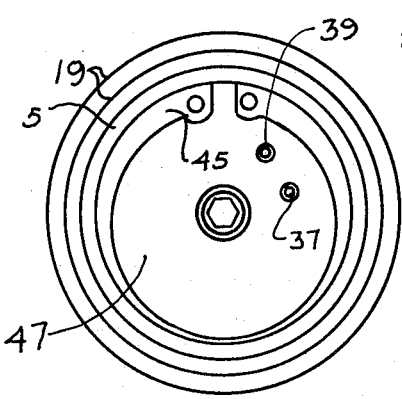
FIG. 4 is a top plan view of the electrode of FIG. 1.

The electrode body 3 is machined from a stainless steel rod. The stem part is turned to a smaller diameter than the button part 7 and an external thread is cut on the stem 5. An axial bore 13 in the stem 5 extends to within a short distance of the broad face 15 of the button part 7. The thickness of the wall 17 between the bore 13 and electrode face 15 is a small fraction of its diameter (the diameter of the bore 13). The electrode face 15 is concave. As shown in FIG. 2, the concavity in this embodiment is spherical and extends all the way to the perimeter of the button part 7. The wall 17 is therefore thicker at its perimeter than at its center. It has been found that within a range of bore sizes of about 0.375 to about 0.5 inches a minimum thickness of wall 17 of less than about 0.08 inches is advantageous. The rear margin of the button part 7 is provided with conventional annular teeth 19 for forming a seal with the housing in which the electrode is inserted.

The electrode body 3 is preferably made of stainless steel, but may be made of other well known materials such as platinum, titanium, tantalum and special alloys compatible with the flowing medium. Because the resonant frequency of the transducer is a function of the speed of sound in the materials of which it is made and its length, and because the wall 17 is effectively a part of the transducer in operation, the thinness of the wall 17 makes its contribution to the resonant frequency practically negligible and allows the same transducer to be used in electrodes made of numerous different materials.

Figure 5:
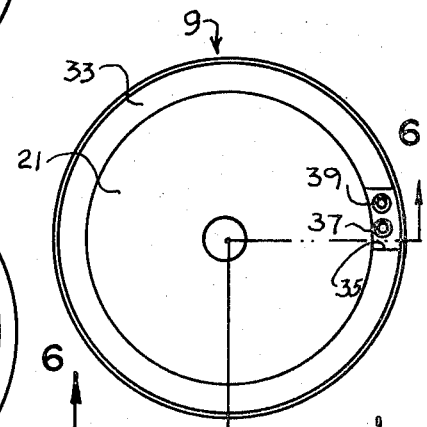
FIG. 5 is a top plan view of an electroacoustical transducer utilized in the electrode of FIG. 1.
Figure 6:
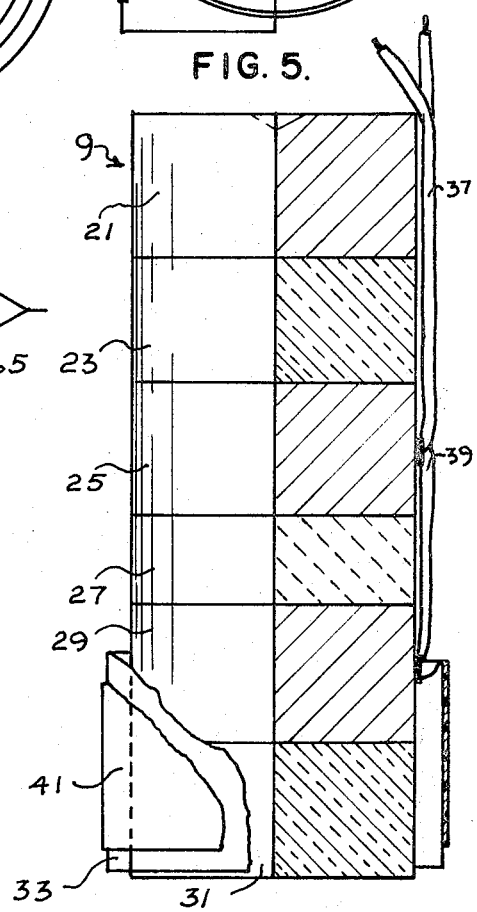
FIG. 6 is a partial sectional view taken along the line 6—6 of FIG. 5.

The transducer assembly 9, as best shown in FIGS. 5 and 6, includes a stack of disc elements held in face to face alignment in a pair of coaxial sleeves. The stack of discs includes, from top to bottom, a stainless steel compression disc 21 at the top of the stack, a glass or ceramic insulating disc 23, a stainless steel contact 25, a piezoelectric ceramic disc 27, a second stainless steel contact 29 and a second glass or ceramic insulator 31. The thickness of the discs 21-31 is chosen to provide a suitable cleaning frequency in accordance with well known practice. The inner sleeve 33 is made of a resilient material such as a fiberglass-reinforced epoxy and is split longitudinally to hold the stack of discs firmly in alignment. The longitudinal slot, indicated at 35, also provides a passage for a pair of leads 37 and 39 connected to the contacts 25 and 29 respectively. The outer sleeve 41 is merely an insulator and shield and may be a tubular polyester film.

The compression member 11 consists of a snap ring 45 held in an annular groove 43 in the bore 13 of the electrode body, a compression plate 47 and a compression screw 49 threaded through a central opening in the compression plate 47. The screw 49 is tightened sufficiently to assure that the wall 17 vibrates with the transducer 9.

By way of example, the electrode 1 may have the following specifications:

| | |
|---|---|
| Overall Length | 0.953" |
| Diameter of Button Part | 1.00" |
| Diameter of Bore 13 | 0.51" |
| Depth of Bore | 0.873" |
| Thickness of Wall 17 at Center | 0.045" |
| Radius of Curvature of Face 17 | 3.5" |
| Torque on Screw | 50 inch oz. |

The electrode 1 is inserted into an instrument such as an electromagnetic flowmeter through a bore 51 in the flow tube 2 of the meter. As shown in FIG. 2, the meter tube 2 may be of standard construction including a non-magnetic metallic casing 53 and a liner 55 of an electrically insulative material such as polytetrafluoroethylene (TFE). A bushing sleeve 57 centers the electrode 1 and electrically insulates it from the meter wall. The annular teeth 19 seal the inner end of the aperture 51. A nut 59 threaded on the stem part 3 pulls the button part 7 of the electrode against the liner 55. A washer 61 between the nut 59 and bushing 57 forms an electrical contact for the electrode body 3.

The use of the electrode 1 in an electromagnetic flowmeter is shown schematically in FIG. 7. As shown in FIG. 7, activating coils 63 produce an alternating magnetic field across the flow tube 2, nominally at a frequency of 50 to 60 Hz. The flow of a fluid through the magnetic field induces a voltage normal to the field, and this voltage is picked up by the electrode 1. This alternating voltage is amplified and displayed by standard read-out equipment 65, shown diagrammatically as an amplifier in FIG. 7. The leads 37 and 39 of the transducer 9 are connected to a high frequency signal generator 67 which produces high voltage alternating energy at a frequency on the order of 50 to 100 KHz.

It has been found that the thin wall 17 and concave face 15 produce the greatest apparent acceleration at the center of the face 15, and that the ultrasonic energy spreads along the face 15 from its center to its edge. This provides a particularly effective cleaning action, and permits complete cleaning of the electrodes even when metering fluids such as sludge which otherwise tend to coat the electrodes in a matter of minutes. It will be seen that the concave surface 15 provides a thinner area at the center of the wall 17 which acts as a diaphragm integral with the electrode body. It also provides a wall which is well able to withstand the forces to which it may be subjected and which is in fact reinforced at its center by the transducer assembly against pressure exerted from within the flow tube 53.

Numerous variations in the electrode of this invention, within the scope of the appended claims, will occur to those skilled in the art in light of the foregoing disclosure. For example, although the transducer is preferably a loose stack, the individual pieces may be cemented to each other and the stack may be cemented to the rear face of the wall 17. The dimensions and shape of the electrode body may be altered. Other means may be utilized for holding the transducer to the rear face of the wall 17. These variations are merely illustrative.

Having thus described the invention, what is claimed and desired to be secured by Letters Patent is:

1. In a button electrode comprising a unitary electrode body having a stem part and a button part of larger diameter than said stem part, said button having a broad face adapted to contact a liquid confined by a housing, said electrode being adapted to be mounted in the housing, with the button part held against the inside of the housing wall and the stem extending through the housing, said electrode further comprising electrical contact means electrically connected to said stem part, the improvement comprising an axial bore in said stem part, said axial bore extending to within about 0.08 inch of at least a part of said broad face of said button, the wall between said bore and said part of said broad face forming a diaphragm integral with said electrode; an ultrasonic transducer in said bore, electrically insulated from said electrode body; and means for holding said transducer in contact with said diaphragm wall.

2. The improvement of claim 1 wherein said broad face is concave, said diaphragm wall being thicker at the margin of said bore than at the center of said bore.

3. The improvement of claim 1 wherein said bore is circular in cross section, and wherein said transducer comprises in cross section, and wherein said transducer comprises a piezoelectric disc, an electrical contact on each opposite broad face of said disc, and an electrically insulative disc between one of said contacts and the bottom of said bore.

4. The improvement of claim 3 wherein said means for holding said transducer in contact with said diaphragm wall comprise compression means at the open end of said axial bore for exerting a desired axial thrust on said transducer, said transducer being trapped between said compression means and said diaphragm wall.

5. The improvement of claim 4 wherein said electrode body is made of stainless steel.

6. An ultrasonically cleaned electrode including a body having a concave face adapted to be in contact with a contaminated fluid and transducer means for vibrating said face at an ultrasonic frequency, said body including a bore having a generally flat bottom face, said flat bottom face and said concave face being opposed faces of a common wall, said wall between said faces being thin relative to the width of said bore, and means for holding said transducer means against said flat bottom face of said bore.

7. The electrode of claim 6 wherein said transducer comprises a stack of elements including a piezoelectric piece, an electrical contact on each opposite broad face of said piezoelectric piece, and an electrically insulative piece between one of said contacts and the bottom of said bore, and wherein said means for holding said transducer against said wall comprise compression means at the open end of said axial bore for exerting a desired axial thrust on said transducer, said transducer being trapped between said compression means and said wall.

8. An electromagnetic flowmeter adapted to operate accurately and without interruption when metering a contaminated fluid, said flowmeter comprising:

a. a flow tube through which the fluid to be metered is flowable, b. means for establishing a magnetic field across said tube, c. a pair of transducer-electrode assemblies each having a hollow stem part extending through said flow tube and an enlarged button part held against an interior wall of said flow tube, said button part closing the bottom of said hollow stem part, said button part having a broad concave face, the two electrodes of said pair being disposed at diametrically opposed positions whereby a voltage induced in said fluid is picked up by said electrodes, an electroacoustical transducer carried within each electrode stem part, and means for holding said transducer against said button part, d. amplifier means electrically connected to said electrodes for amplifying said voltage picked up by said electrodes, and e. ultrasonic signal generating means for supplying a high frequency voltage to said transducers, whereby said transducers vibrate said broad face at an ultrasonic frequency to clean said electrodes.

9. The flowmeter of claim 8 wherein said face is a surface of revolution generated about an axis normal to the axis of said flow tube.

10. The flowmeter of claim 8 wherein the button part is thin relative to the internal diameter of said hollow stem.

11. The flowmeter of claim 10 wherein said stem part and said button part are parts of a unitary electrode body.

12. The flowmeter of claim 8 wherein the thickness of said button part at its center is less than 0.08 inch.

13. The flowmeter of claim 12 wherein the thickness of said button part is greater at the margin of said hollow stem that at its center.

14. The improvement of claim 8 wherein said means for holding said transducer against said button part comprise compression means at the free end of said hollow stem for exerting a desired axial thrust on said transducer, said transducer being trapped between said compression means and said button part.

15. A self-cleaning magnetic flowmeter adapted to operate accurately and without interruption when metering a contaminated fluid, said flowmeter comprising:

a. a flow tube through which the fluid to be metered is flowable, b. means to establish a magnetic field across said tube, c. a pair of transducer-electrode assemblies, each having a unitary body part including a step part and a button part of larger diameter than said stem part, said button having a broad face in contact with said fluid, said stem extending through said flow tube and said button part being held against an interior wall of said flow tube, the two electrodes of said pair being disposed at diametrically opposed positions whereby a voltage induced in said fluid is picked up by said electrodes, an axial bore in said stem part, said axial bore extending to within about 0.08 inch of at least a part of said broad face of said button, whereby the wall between said bore and said part of said face is a diaphragm integral with said electrode; an electroacoustical transducer in said bore, electrically insulated from said electrode body; means for holding said transducer in contact with said diaphragm wall; and electrical contact means electrically connected to said transducer, d. amplifier means electrically connected to said electrodes for amplifying said voltage picked up by said electrodes, and e. ultrasonic signal generating means for supplying a high frequency voltage to said transducers, whereby said transducers vibrate said broad face at an ultrasonic frequency to clean said electrodes.

16. The improvement of claim 15 wherein said means for holding said transducer in contact with said diaphragm wall comprise compression means at the open end of said axial bore for exerting a desired axial thrust on said transducer, said transducer being trapped between said compression means and said diaphragm wall.

17. A self-cleaning magnetic flowmeter adapted to operate accurately and without interruption when metering a contaminated fluid, said flowmeter comprising:

a. a flow tube through which the fluid to be metered is flowable.

b. means to establish a magnetic field across said tube, c. a pair of transducer-electrode assemblies each having a hollow unitary electrode body, said body having a wall at one end, an outer surface of said wall forming an electrode face in contact with said fluid; an electroacoustical transducer in said electrode body, and means for holding said transducer to said wall, said wall being thin at its center relative to the diameter of said electrode face, the two electrodes of said pair being disposed at diametrically opposed positions whereby a voltage induced in said fluid is picked up by said electrodes, d. amplifier means electrically connected to said electrodes for amplifying said voltage picked up by said electrodes, and e. ultrasonic signal generating means for supplying a high frequency voltage to said transducers, whereby said transducers vibrate said broad face at an ultrasonic frequency to clean said electrodes.

18. The flowmeter of claim 17 wherein said electrode face is concave.

19. The flowmeter of claim 18 wherein said electrode face is a surface of revolution generated about an axis normal to the axis of said flow tube.

20. The improvement of claim 17 wherein said means for holding said transducer in contact with said wall comprise compression means at the open end of said axial bore for exerting a desired axial thrust on said transducer, said transducer being trapped between said compression means and said wall.

21. A self-cleaning magnetic flowmeter adapted to operate accurately and without interruption when metering a contaminated fluid, said flowmeter comprising:

a. a flow tube through which the fluid to be metered is flowable, b. means to establish a magnetic field across said tube, c. a pair of transducer electrode assemblies each having a hollow electrode body, said body having a wall at one end, an outer surface of said wall forming an electrode face in contact with said fluid, said electrode face being concave; an electroacoustical transducer in said electrode body and means for holding said transducer to said wall, said wall having a diameter which is at least several times greater than the thickness of said wall, the two electrodes of said pair being disposed at diametrically opposed positions whereby a voltage induced in said fluid is picked up by said electrodes, d. amplifier means electrically connected to said electrode for amplifying said voltage picked up by said electrodes, and e. ultrasonic signal generating means for supplying a high frequency voltage to said transducers, whereby said transducers vibrate said broad face at an ultrasonic frequency to clean said electrodes.

22. The flowmeter of claim 21 wherein said electrode face is a surface of revolution generated about an axis normal to the axis of said flow tube.

23. A self-cleaning magnetic flowmeter adapted to operate accurately and without interruption when metering a contaminated fluid, said flowmeter comprising:

a. a flow tube through which the fluid to be metered is flowable, b. means to establish a magnetic field across said tube, c. a pair of transducer-electrode assemblies, each including a body having a face in contact with said fluid and electroacoustical transducer means for vibrating said face at an ultrasonic frequency, said face being concave both in a plane parallel to the axis of said flow tube and in a plane normal to the axis of said flow tube, the two electrodes of said pair being disposed at diametrically opposed positions whereby a voltage induced in said fluid is picked up by said electrodes, d. amplifier means electrically connected to said electrodes for amplifying said voltage picked up by said electrodes, and e. ultrasonic signal generating means for supplying a high frequency voltage to said transducers, whereby said transducers vibrate said body face at an ultrasonic frequency to clean said electrodes.

24. The flowmeter of claim 23 wherein said face is a surface of revolution generated about an axis normal to the axis of said flow tube.

25. The flowmeter of claim 24 wherein said face is spherically concave.

* * * * *

UNITED STATES PATENT OFFICE
CERTIFICATE OF CORRECTION

Patent No. 3,771,361          Dated November 13, 1973

Inventor(s) Stephen Reznick

It is certified that error appears in the above-identified patent and that said Letters Patent are hereby corrected as shown below:

Col. 2, line 15, cancel "flow" and insert ---tube---;

Col. 4, lines 30 and 31, delete "in cross section, and wherein said transducer comprises";

Col. 5, line 53, "step" should be "stem"

Signed and sealed this 23rd day of July 1974.

(SEAL)
Attest:

McCOY M. GIBSON, JR.
Attesting Officer

C. MARSHALL DANN
Commissioner of Patents